June 14, 1960     A. W. BEUCKER     2,940,125
METHOD OF PRODUCING DESIGNS ON HEAT-TREATED ARTICLES
Filed Sept. 17, 1956     2 Sheets-Sheet 1

INVENTOR.
ALBERT W. BEUCKER
BY
James and Franklin
ATTORNEY

June 14, 1960     A. W. BEUCKER     2,940,125
METHOD OF PRODUCING DESIGNS ON HEAT-TREATED ARTICLES
Filed Sept. 17, 1956     2 Sheets-Sheet 2
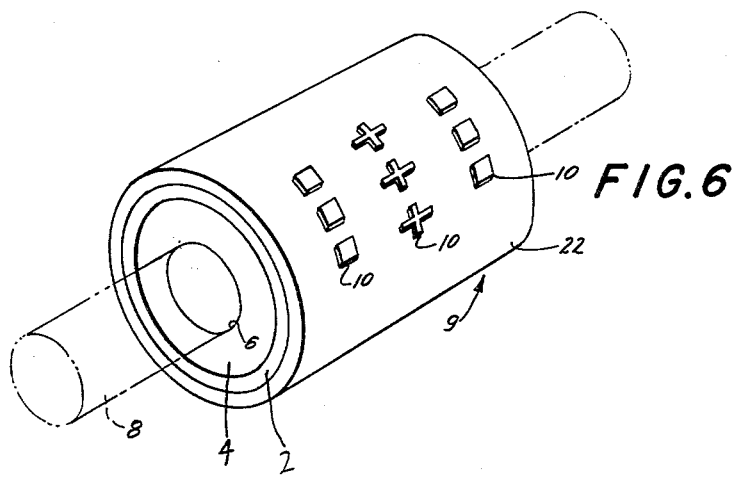
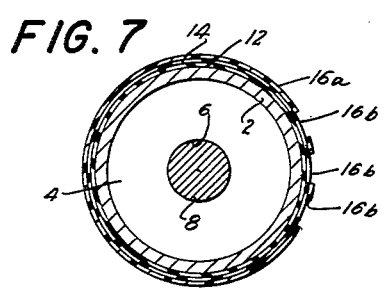 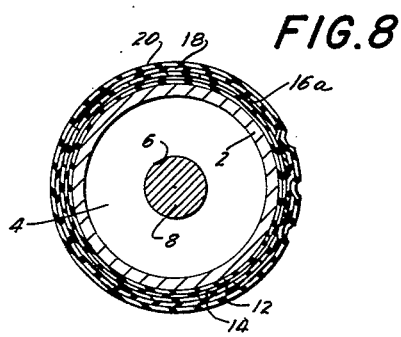
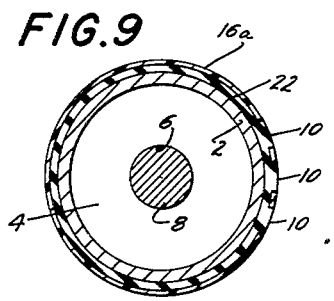 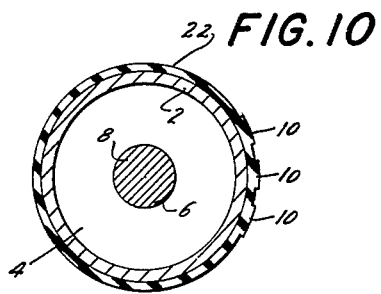
*INVENTOR.*
ALBERT W. BEUCKER
BY
*James and Franklin*
ATTORNEY United States Patent Office 2,940,125
Patented June 14, 1960

2,940,125

METHOD OF PRODUCING DESIGNS ON HEAT-TREATED ARTICLES

Albert W. Beucker, Ramsey, N.J., assignor to Raybestos-Manhattan, Inc., Passaic, N.J., a corporation of New Jersey Filed Sept. 17, 1956, Ser. No. 610,353

1 Claim. (Cl. 18—47.5)

The present invention relates to a method of producing designs, either in relief or intaglio, on articles formed of heat-treated material such as rubber or various plastics such as vinyl resins, and particularly objects such as plates, rollers or blankets used to apply that design, by way of printing, impressing or the like, to some other object.

In the production of various products of widely varying natures it is frequently desired to apply to the surface thereof a given pattern or design which may be ornamental, functional, or in the form of printing so as to convey intelligence. Some type of what may loosely be termed a "printing plate" is usually employed to this end, that "printing plate" having its surface modified corresponding to the desired design so as to be capable of imparting that design to the object being treated. It will be understood that the term "printing plate" is used primarily in a figurative sense, particularly where the designs formed in the surface of the design-applying article are of appreciable depth. Moreover, it will be understood while the design-applying article may be used in a manner similar to that of a printing plate in order to apply pigment to or remove pigment from the object being treated, it may also be employed for actually forming three-dimensional designs in the treated object by deforming the surface thereof. The designs formed in the applying article are sometimes in relief, standing out from the surface of that object, and sometimes are in intaglio, depressed beneath the applying surface.

The present invention relates specifically to the method of forming the designs in the surface of the applying article. In the past this has been a fairly expensive and time-consuming matter. The desired designs have sometimes been molded into the surface of the article, and have sometimes been machined or cut therein. In the case of molding the die cost is exceedingly high. Heavy press equipment must be employed and the size of the article, to which this can be done, particularly in the case of rollers and blankets, is quite limited. Machining is time consuming and usually requires the use of skilled workmen. Moreover, when an article having a rubber or rubber-like applying surface is involved, machining is particularly difficult due to the usually resilient nature of that surface. (By the term "rubber" as used in this specification I mean natural rubber and the various synthetic rubbers and rubber-like materials which are comparatively soft before heat treatment and which may be vulcanized or otherwise heat treated to a permanent final condition. In the vulcanized or heat treated state these materials may vary widely in their softness, from very soft to very hard.)

While the invention is here specifically disclosed in connection with the manufacture of a design-applying roller, this is by way of exemplification only, and it will be understood that the method is also applicable to other articles, such as blankets, belts and plates.

The method comprises building up the design-applying article from a plurality of layers of appropriate material prior to the vulcanization or other heat treatment thereof, and incorporating into that built-up structure between certain of the layers thereof cutouts of the design desired, these cutouts being formed of a material different from that of the design-applying article and having characteristics such that it will not attack, blend with, nor be bonded to the material of which the design-applying article is formed even after subjection to heat treatment. After the built-up body has been thus assembled with one or more layers over the cutouts, the composite article is vulcanized or otherwise appropriately heat treated, and thereafter its outer surface is removed to a depth sufficient to expose the cutouts. The cutouts are then, after being exposed, removed from the article, leaving voids or spaces where they formerly had been. Thus if the body of a cutout was of the shape of the desired design, that design will be formed in intaglio in the surface of the design-applying article. If the cutout is so designed that it has an opening corresponding in shape to the desired design, that design will stand out in relief on the surface of the design-applying article.

While a machining operation is involved in the instant invention, that operation is a gross one, and is in no way related directly to the particular designs required. All that is involved is the removal, substantially uniformly as to depth, of the outer surface of the design-applying article over its entire area, or at least over the area thereof which will serve as a background for the designs. Since the machining is not relied upon to produce the designs themselves, it may be performed rapidly and inexpensively on conventional automatic machinery such as surface grinders.

To the accomplishment of the above, and to such other objects as may hereinafter appear, the present invention relates to the method of forming three-dimensional designs on the surface of an object, as defined in the appended claim and as described in this specification, taken together with the accompanying drawings, in which:

Figs. 6–10 are views similar to Figs. 1–5 respectively but showing the use of cutouts shaped to produce designs in relief on the roller.

Figure 1:
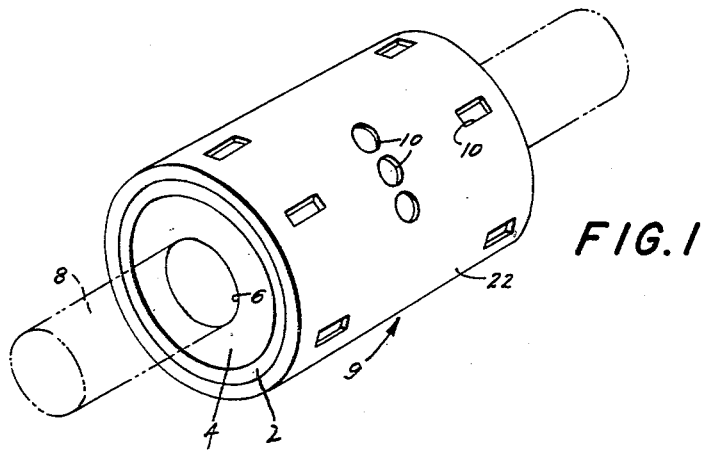
Fig. 1 is a three-quarter perspective view of a "printing" roller having certain arbitrary designs formed therein in intaglio.

Turning first to the embodiment of Figs. 1–5, the finished roller comprises a rigid supporting ring 2 of metal or the like having end portions 4 provided with apertures 6 through which a shaft 8 is adapted to pass, to which shaft the roller is connected for rotation. The outer surface of the ring 2 carries a rubber sleeve generally designated 9 having designs 10 formed as depressions in its outer surface. These designs are here shown as conventional geometric figures, purely for simplicity of illustration, but it will be understood that they could take any desired form.

To produce the roller it is built up, as is conventional, from a plurality of layers or sheets of unvulcanized rubber or rubber-like materials, those layers or sheets afterwards being vulcanized or heat treated to produce the sleeve 9. In accordance with the present invention a selected number of layers of rubber or rubber-like material, here shown as two in number and designated 12 and 14, are applied to the periphery of the ring 2.

Figure 2:
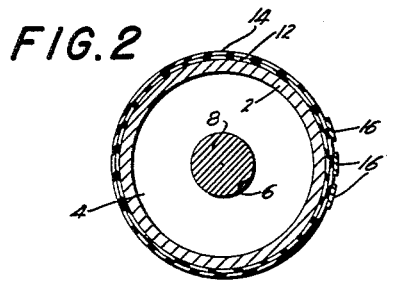
Fig. 2 is a cross sectional view of the "printing" roller of Fig. 1 during a preliminary stage of its manufacture in accordance with the present invention, cutouts having just been applied thereto.

Next cutouts 16 of appropriate shape are positioned on the outer surface of the outer rubber layer 14 (see Fig. 2). These cutouts 16, in the embodiment of Figs. 1–5, have the shape and size of the designs desired. They are formed of a material which is incompatible with the material of the layers 12 and 14 in the sense that it will not dissolve in, bond or adhere to that material, and will not adversely affect it, even after subjection to a vulcanization or other heat treating process. When the sheets 12 and 14 are formed of natural or synthetic rubber, it has been found that the cutouts 16 may advantageously be formed of polyethylene, plasticized or unplasticized polyvinyl chloride or vulcanized rubber. These materials are to be taken as exemplary only, since many other synthetic materials, and even non-synthetic materials such as metal, would be satisfactory. The thickness of the cutouts 16 will depend upon the desired depth of the designs 10 to be formed in the finished sleeve 9. Thicknesses from $1/16$ of an inch to $1/2$ inch have been found to work very well, but these values are by no means to be considered as limiting.

Figure 3:
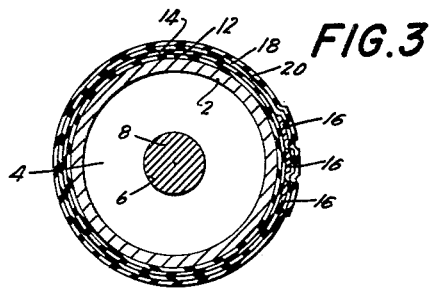
Fig. 3 is a view similar to Fig. 2 but showing a further stage in the manufacture of the roller, additional layers of material having been superimposed on the roller of Fig. 2.

Thereafter an additional layer or layers of unvulcanized material is applied over the roller of Fig. 2. As shown in Fig. 3, two such layers, designated 18 and 20, are applied. As may clearly be seen in Fig. 3, those portions of the layers 18 and 20 which extend over the cutouts 16 bulge radially outwardly. Care should be taken that these additional rubber layers 18 and 20 are pressed against the cutouts 16 so as to conform as closely as possible to their shape, and to facilitate this it is advantageous to remove as much air as possible from the areas around the cutouts 16 and from between the adjacent rubber layers as they are applied, while the roller is being built up. This building up process continues until the overall thickness of the superposed layers, apart from the areas where the cutouts 16 are applied, is somewhat greater than the desired thickness of the finished sleeve 9.

It is advantageous, in view of the machine operation which follows, that care be taken to maintain concentricity with the axis of the apertures 6 or the shaft 8 of the outer surface of the built-up rubber layers as they are applied.

After the building up process has been completed the roller is vulcanized in conventional fashion in an autoclave using suitable temperatures, pressures and times depending upon the nature of the rubber material of which the layers 12, 14, 18 and 20 are formed, all as is well known to those skilled in the art. This vulcanization process will result in an amalgamation of the various layers 12, 14, 18 and 20 into a single unified layer of vulcanized rubber generally designated 22.

Figure 4:
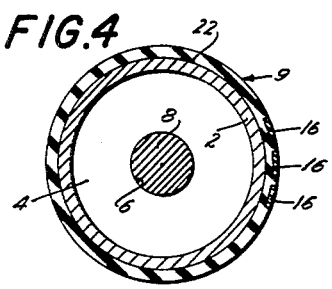
Fig. 4 is a cross sectional view similar to Fig. 3 but showing the roller after vulcanization and after the outer portion thereof has been removed so as to expose the cutouts.
Figure 5:
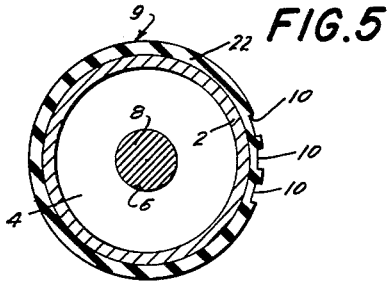
Fig. 5 is a view similar to Fig. 4 after the cutouts have been removed to produce intaglio designs.

Thereafter the outer surface of the layer 22 is cut or ground away, preferably concentrically with the apertures 6 and shaft 8, until the cutouts 16 are entirely exposed at their radially outer surfaces. This condition of the roller is illustrated in Fig. 4.

Since the cutouts 16 are non-adherent to the rubber making up the vulcanized layer 22, they may then be removed, leaving in their place depressions or openings 10 shaped corresponding to the shape of the cutouts 16 and hence defining the desired designs. It will be noted that these openings or depressions 10 have rubber bottoms produced by the initially applied layers 12 and 14.

It will be understood that if it is desired to produce designs of varying depth, this can readily be done by utilizing cutouts 16 of varying thicknesses, and by applying the thicker cutouts 16 to the roller during earlier stages of the build-up thereof from sheets of unvulcanized rubber. For example, selected thicker cutouts 16 could be applied to the layer 12 before the layer 14 is applied, the thinner cutouts 16 being applied to the layer 14 as shown, all of the cutouts then being covered by the layers 18 and 20.

While the embodiment of Figs. 1–5 has been described in connection with the use of four layers of unvulcanized material, two (12 and 14) applied before the cutout 16 and two (18 and 20) applied thereafter, this is by way of exemplification only, and fewer or more layers of unvulcanized rubber could be utilized at each state of the build-up process.

The embodiment of Figs. 6–10 is essentially similar to that of Figs. 1–5 except for the material of the cutout 16, and similar reference numerals are applied to corresponding elements. In the embodiment of Figs. 6–10 the cutout is in the form of a sheet $16a$ having openings $16b$ therein, the sheet $16a$ extending completely around the outer unvulcanized layer 14 and the openings $16b$ having shapes corresponding to the desired designs. Consequently, after the layers 18 and 20 have been added, and as may clearly be seen in Fig. 8, the portions of the outer layers 18 and 20 which register with the openings $16b$ will extend radially inwardly, instead of bulging outwardly as in the embodiment of Figs. 1–5. As a result, after vulcanization, portions of the vulcanized layer 22 extend into the openings $16b$ in the sheet $16a$, and after that sheet $16a$ has been exposed and stripped from the roller, the portions of the vulcanized layer 22 which extended into the spaces $16b$ will project outwardly and thus define the desired designs in relief. Relief designs of different depths may readily be produced by using a plurality of superposed cutout sheets $16a$, the outer sheets having openings registering with openings in the inner sheets to produce high relief designs and the inner sheets having openings covered by the body of the outer sheets to produce low relief designs.

Since the cutouts 16 or $16a$ are formed from materials which may be readily worked with and shaped as desired, either by manual cutting, by the use of a stamping process, or in any other conventional way, it will be seen that accurate designs may be formed in the surface of the design-applying articles here disclosed in a simple and inexpensive manner well adapted to quantity production, and that the particular softness characteristics of the finished sleeve 9 do not affect the ease or accuracy with which these designs may be produced. The cutouts 16 and $16a$ are substantially unaffected by their use, and may be reused a substantial number of times, thus ensuring uniformity when a number of similar articles are to be manufactured.

The finished design-applying articles, whether they be rollers, blankets, belts, plates, or other articles having designed, patterned, embossed, engraved or discontinuous surfaces formed thereon, find wide application in the printing of cloth, paper, plastics and metals, in the production of designs by the selected shrinking or compression of cloth and paper, and in the embossing of cloth, paper and plastics. In addition, the method of the present invention could also be applied to the manufacture of rubber articles which are not to be used to apply designs to other objects, but which instead are merely to have particular designs on their surfaces, as for ornamentation.

While but a limited number of embodiments of the present invention have been here disclosed, it will be apparent that many variations may be made therein, all within the scope of the instant invention as defined in the following claim.

I claim:

A method of forming designs on a cylindrical support which comprises covering the cylindrical surface of said support with a base of predetermined thickness the outer surface of which is concentric with said cylindrical support surface, said base being formed from heat-treatable material prior to heat treatment thereof, applying to the outer surface of said base a member of appreciable size and substantially uniform thickness which is edge-shaped corresponding to the design desired and which is formed of a material which will not combine with or adhere to said heat-treatable material in any of its heat-treatment stages, applying an additional thickness of said heat-treatable material thereover and over substantially all of the outer surfaces of said base and in close proximity to the edges of said member, thereby building up said cylindrical structure to a diameter greater than the desired final diameter of said structure, subjecting the thus-formed composite article to a heat treating operation, machining away heat-treated material from the exposed surface of said composite article concentrically with said support to expose said member but with the maximum thickness of the remaining heat-treated material greater than the thickness thereof directly under said member, and removing said member from said composite article.

References Cited in the file of this patent

UNITED STATES PATENTS

| | | |
|---|---|---|
| 1,847,574 | Sigel | Mar. 1, 1932 |
| 2,663,663 | Weltman et al. | Dec. 22, 1953 |
| 2,768,923 | Kepple et al. | Oct. 30, 1956 |